US012187044B2

(12) United States Patent
Naito et al.

(10) Patent No.: US 12,187,044 B2
(45) Date of Patent: Jan. 7, 2025

(54) INK CONTAINER

(71) Applicant: SEIKO EPSON CORPORATION, Tokyo (JP)

(72) Inventors: Naoki Naito, Kitaazumi-gun Ikeda-machi (JP); Eiko Yanagida, Shiojiri (JP); Yoshiharu Mizuno, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 167 days.

(21) Appl. No.: 18/163,639

(22) Filed: Feb. 2, 2023

(65) Prior Publication Data

US 2023/0241899 A1 Aug. 3, 2023

(30) Foreign Application Priority Data

Feb. 3, 2022 (JP) .................................. 2022-015483

(51) Int. Cl.
*B41J 2/175* (2006.01)
(52) U.S. Cl.
CPC ................................ *B41J 2/17536* (2013.01)
(58) Field of Classification Search
CPC .... B41J 2/175; B41J 2/17503; B41J 2/17506; B41J 2/17509; B41J 2/17513; B41J 2/1752; B41J 2/17523; B41J 2/17536; B41J 2/17546; B41J 2/17553; Y02W 30/80
See application file for complete search history.

(56) References Cited

U.S. PATENT DOCUMENTS

| | | | |
|---|---|---|---|
| 2012/0092716 A1* | 4/2012 | Ichimura | B41J 2/17566 358/1.15 |
| 2018/0072064 A1* | 3/2018 | Kiyohara | B41J 2/17546 |
| 2021/0046761 A1* | 2/2021 | Tamaru | B41J 2/17566 |
| 2021/0129551 A1* | 5/2021 | Mizutani | B41J 2/17566 |

FOREIGN PATENT DOCUMENTS

| | | | | |
|---|---|---|---|---|
| JP | 2012230560 | * | 11/2012 | ............. G06K 19/07 |
| JP | 2021-028120 A | | 2/2021 | |

* cited by examiner

*Primary Examiner* — Anh T Vo
(74) *Attorney, Agent, or Firm* — Oliff PLC

(57) ABSTRACT

An ink container includes a storage section configured to store an ink, a supply tube configured to supply the ink stored in the storage section to a printer, a sealing member disposed in the supply tube, and a holding member configured to hold the sealing member. The holding member is detachably attached to the supply tube and has an indication that indicates that a refilling operation was performed.

5 Claims, 15 Drawing Sheets

INK CONTAINER

The present application is based on, and claims priority from JP Application Serial Number 2022-015483, filed Feb. 3, 2022, the disclosure of which is hereby incorporated by reference herein in its entirety.

BACKGROUND

1. Technical Field

The present disclosure relates to an ink container that stores an ink.

2. Related Art

An example of ink containers is described in, for example, JP-A-2021-28120, which describes a cartridge. This cartridge includes a container pack, which is an example storage section for storing an ink, a supply member for supplying the liquid in the container pack to the outside, and a holding member detachably attached to the supply member. The supply member includes a supply tube, a valve element, a sealing member, and a pressing member. The pressing member presses the valve element against the sealing member. The holding member holds the sealing member from the side opposite to the pressing member.

The holding member and the supply member in JP-A-2021-28120 each have a screw mechanism that engage each other. Accordingly, to attach the holding member to the supply member or detach the holding member from the supply member, the holding member has to be rotated multiple times about the supply member, and thus the holding member is unsuitable for refilling. Even if the product has been refilled, the refilled product cannot be distinguished from other products that have not been refilled, and thus users may not recognize that this product is an environmentally friendly refilled product.

SUMMARY

An ink container to solve the above-described problem includes a storage section configured to store an ink, a supply tube configured to supply the ink stored in the storage section to a printer, a sealing member disposed in the supply tube, and a holding member configured to hold the sealing member. The holding member is detachably attached to the supply tube and has an indication that indicates that a refilling operation has been performed.

DESCRIPTION OF EXEMPLARY EMBODIMENTS

Embodiment

Figure 1:
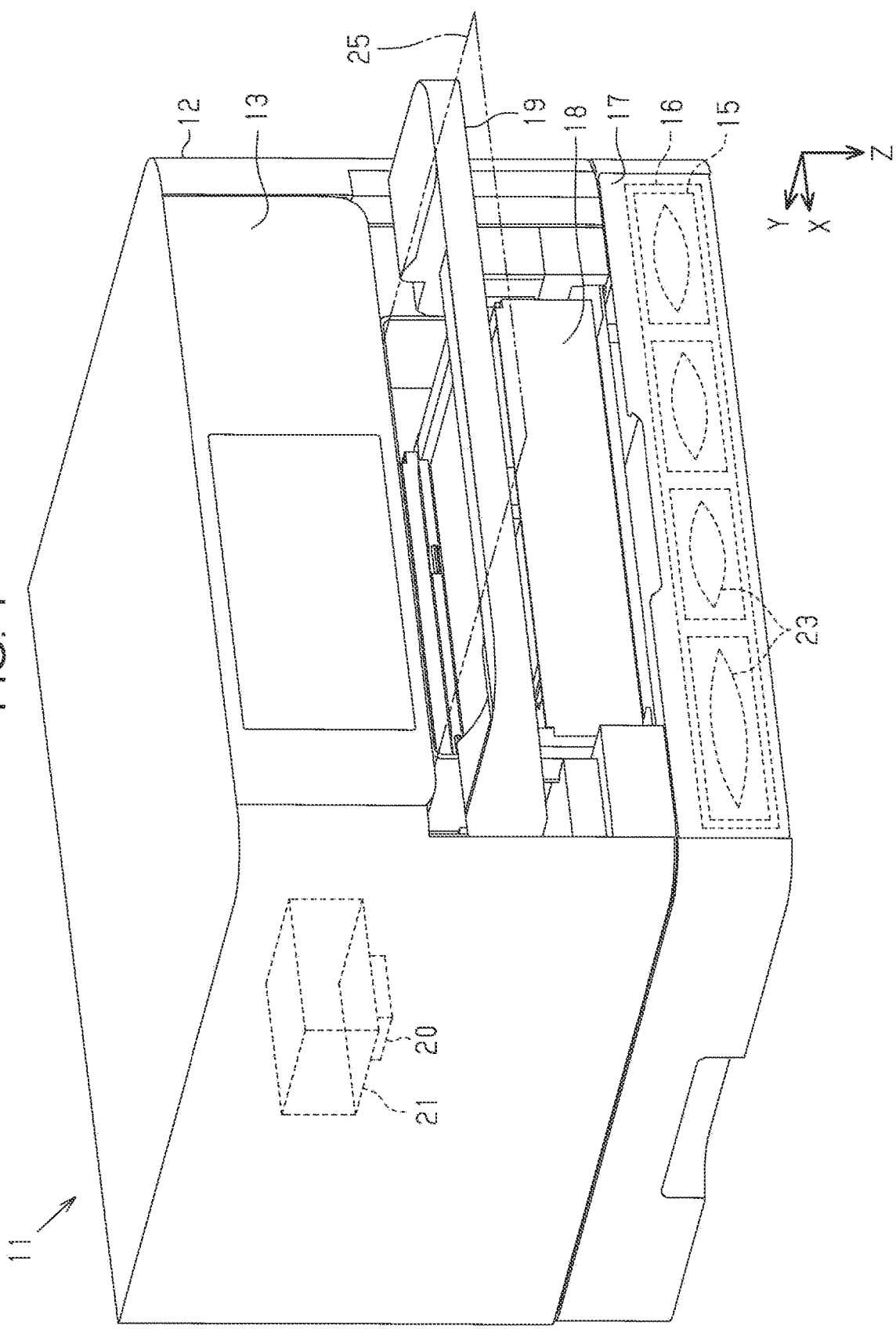
FIG. 1 is a schematic view illustrating an ink container according to an embodiment, the ink container attached to a printer.

Hereinafter, an embodiment of an ink container will be described with reference to the accompanying drawings. The ink container is attached to a printer. The printer is, for example, an ink jet printer that performs printing by ejecting an ink onto a paper sheet, which is an example medium. In the drawings, it is assumed that a printer 11 is installed on a horizontal plane, and the Z-axis denotes the direction of gravity and the X-axis and the Y-axis denote directions along the horizontal plane. The X-axis, the Y-axis, and the Z-axis are orthogonal to each other.

Printer

As illustrated in FIG. 1, the printer 11 may include a casing 12 and an operation panel 13. The operation panel 13 is used by users to operate the printer 11. The operation panel 13 may include a touch panel and/or may include buttons (not illustrated).

The printer 11 may include a container 15, an attachment section 16, a front cover 17, a medium storage section 18, a discharge tray 19, a print head 20, and a carriage 21. The container 15 is detachably attached to the attachment section 16. The container 15 holds an ink container 23. The ink container 23 is attachable to and detachable from the container 15 that has been detached from the attachment section 16. Attaching the container 15 to the attachment section 16 enables the ink in the ink container 23 held by the container 15 to be supplied to the printer 11. The printer 11 may include one or more containers 15.

Ink may be supplied to the printer 11 from a plurality of ink containers 23. The ink containers 23 may be held in one container 15 or in a plurality of containers 15. The printer 11 according to the embodiment includes four containers 15, and each container 15 holds one ink container 23. The ink containers 23 may store different inks. For example, different inks may be inks of different colors such as black, cyan, magenta, and yellow.

The front cover 17 is openable and closable, for example, by being rotated. The front cover 17 that is in a closed position illustrated in FIG. 1 covers the attachment section 16 and the containers 15 attached to the attachment section 16. When the front cover 17 is moved to an open position (not illustrated), the attachment section 16 and the containers 15 are exposed and the container 15 can be attached and detached.

The medium storage section 18 stores sheets of a medium 25. The carriage 21 holds the print head 20 in a movable manner. The print head 20, while being moved, performs printing by ejecting an ink onto the medium 25 supplied from the medium storage section 18. The printed medium 25 is discharged onto the discharge tray 19.

Figure 2:
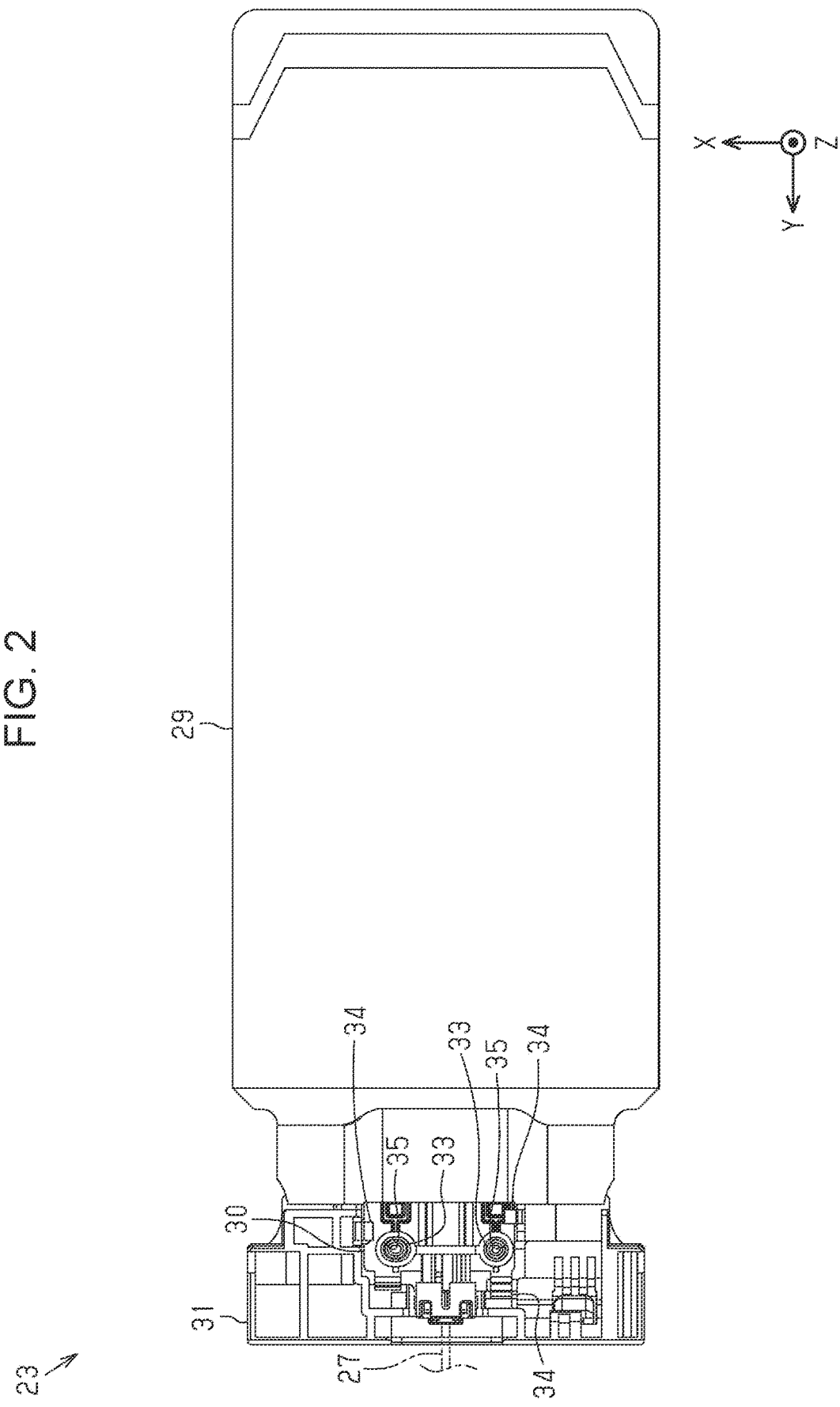
FIG. 2 is a bottom view illustrating an ink container.

The printer 11 may include a supply needle 27 as illustrated in FIG. 2. The printer 11 according to the embodiment includes the same number of supply needles 27 as the number of the ink containers 23, which are attachable to one or more containers 15. The supply needle 27 is disposed at the back of the attachment section 16. When the supply needle 27 is inserted into the ink container 23 attached to the attachment section 16, the ink in the ink container 23 is supplied to the outside.

Ink Container

In the drawings, the X-axis, the Y-axis, and the Z-axis are provided with reference to the orientation of the ink containers 23 attached to the printer 11.

The ink container 23 includes a storage section 29 and a supply member 30 as illustrated in FIG. 2. The ink container 23 may include a supporting member 31. The storage section 29 stores an ink. The storage section 29 according to the embodiment is a pouch comprising a plurality of film members. For example, the storage section 29 may be formed by bonding four sides of two sheets of rectangular film members. The storage section 29 may have a gusset. The supply member 30 according to the embodiment is attached to the storage section 29 such that the supply member 30 is held between two film members.

The supporting member 31 supports the supply member 30. The supporting member 31 may include one or more cylinders 33 and one or more hook portions 34. The supporting member 31 according to the embodiment includes two cylinders 33, that is, a circular cylinder 33 and an elliptic cylinder 33. The cylinders 33 are inserted into positioning holes 35 in the supply member 30 to position the supply member 30 and the supporting member 31. The supporting member 31 according to the embodiment includes three hook portions 34. These three hook portions 34 hold the positioned supply member 30 such that the supply member 30 is caught from three sides.

Supply Member

Figure 3:
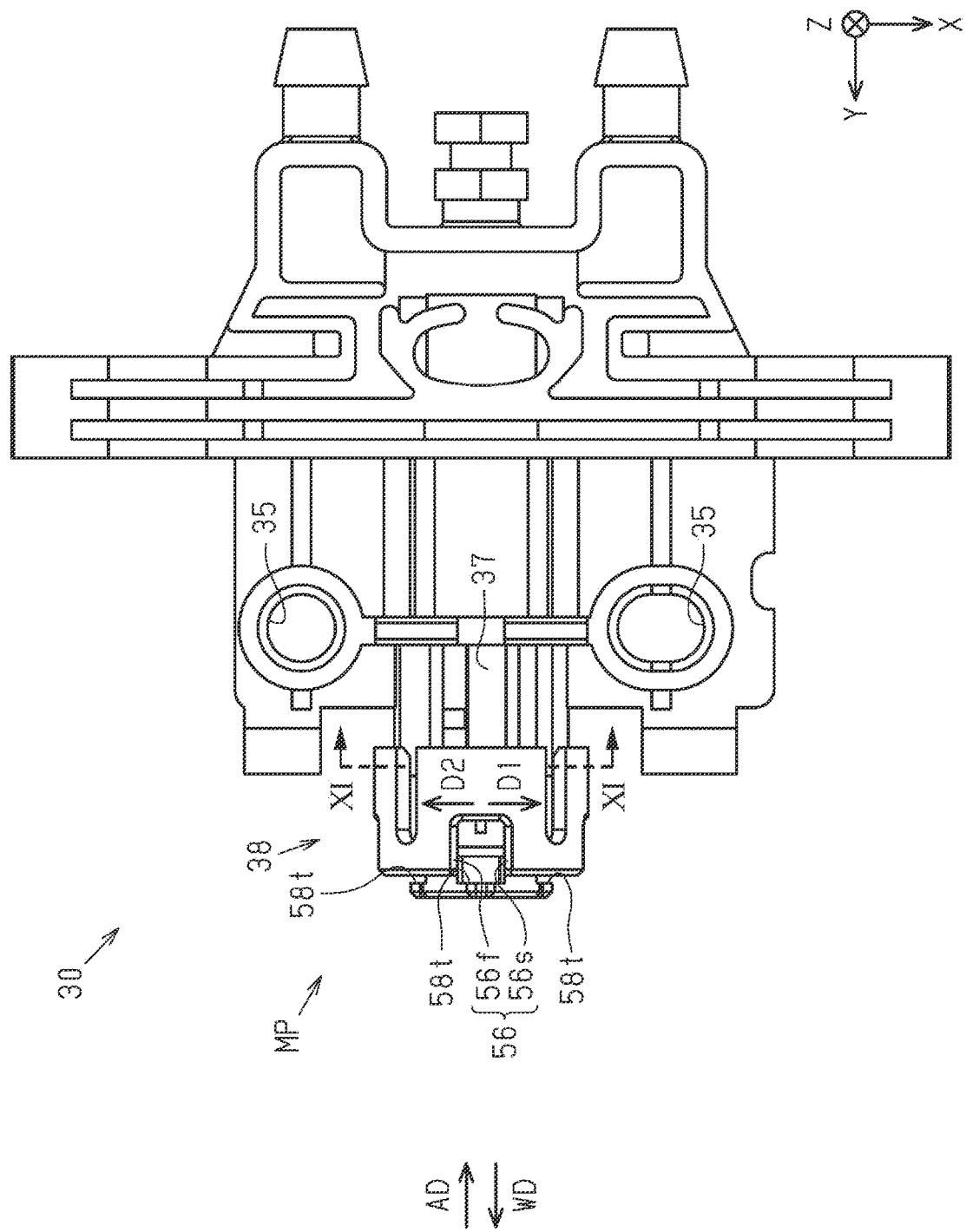
FIG. 3 is a plan view illustrating a supply member with a holding member in a moving position.

The supply member 30 includes a supply tube 37 and a holding member 38 as illustrated in FIG. 3. The holding member 38 is detachably attached to the supply tube 37.

The holding member 38 is movable in an attachment direction AD and a detachment direction WD. More specifically, the holding member 38 that is in a moving position MP with respect to the supply tube 37 illustrated in FIG. 3 is movable in the attachment direction AD and the detachment direction WD.

The attachment direction AD is a direction in which the holding member 38 that has been detached from the supply tube 37 moves toward the supply tube 37. The holding member 38 that has been detached from the supply tube 37 is moved in the attachment direction AD and attached to the supply tube 37. The detachment direction WD is opposite to the attachment direction AD. The detachment direction WD is a direction in which the holding member 38 is detached from the supply tube 37. The holding member 38 that has been attached to the supply tube 37 is moved in the detachment direction WD and detached from the supply tube 37. The attachment direction AD and the detachment direction WD according to the embodiment are parallel to the Y-axis.

Figure 4:
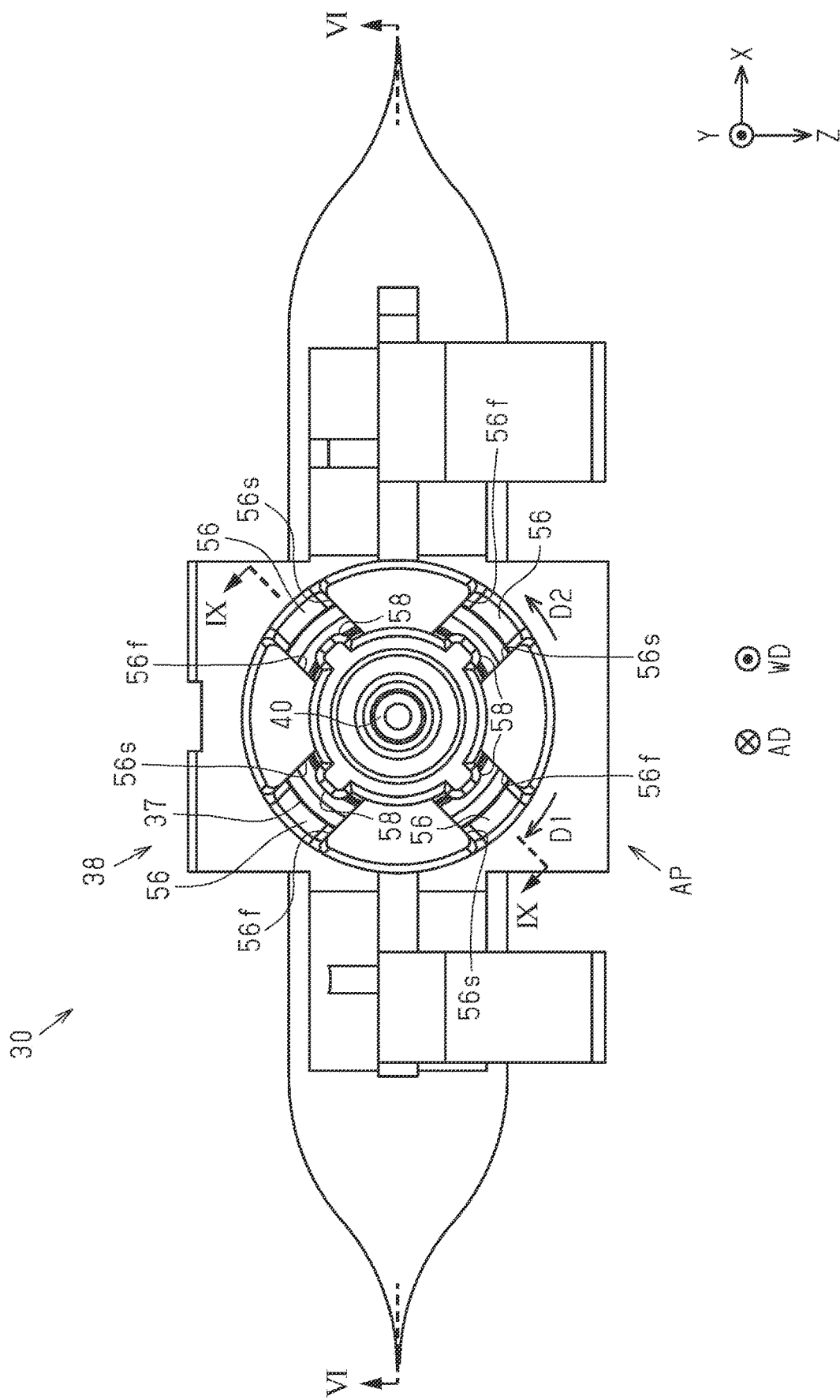
FIG. 4 is a side view of a supply member.

The holding member 38 is rotatable in a first circumferential direction D1 or a second circumferential direction D2 in a state in which the holding member 38 is attached to the supply tube 37, as illustrated in FIG. 4. The first circumferential direction D1 is the clockwise direction in FIG. 4. The second circumferential direction D2 is the counterclockwise direction in FIG. 4. The second circumferential direction D2 is opposite to the first circumferential direction D1.

Figure 5:
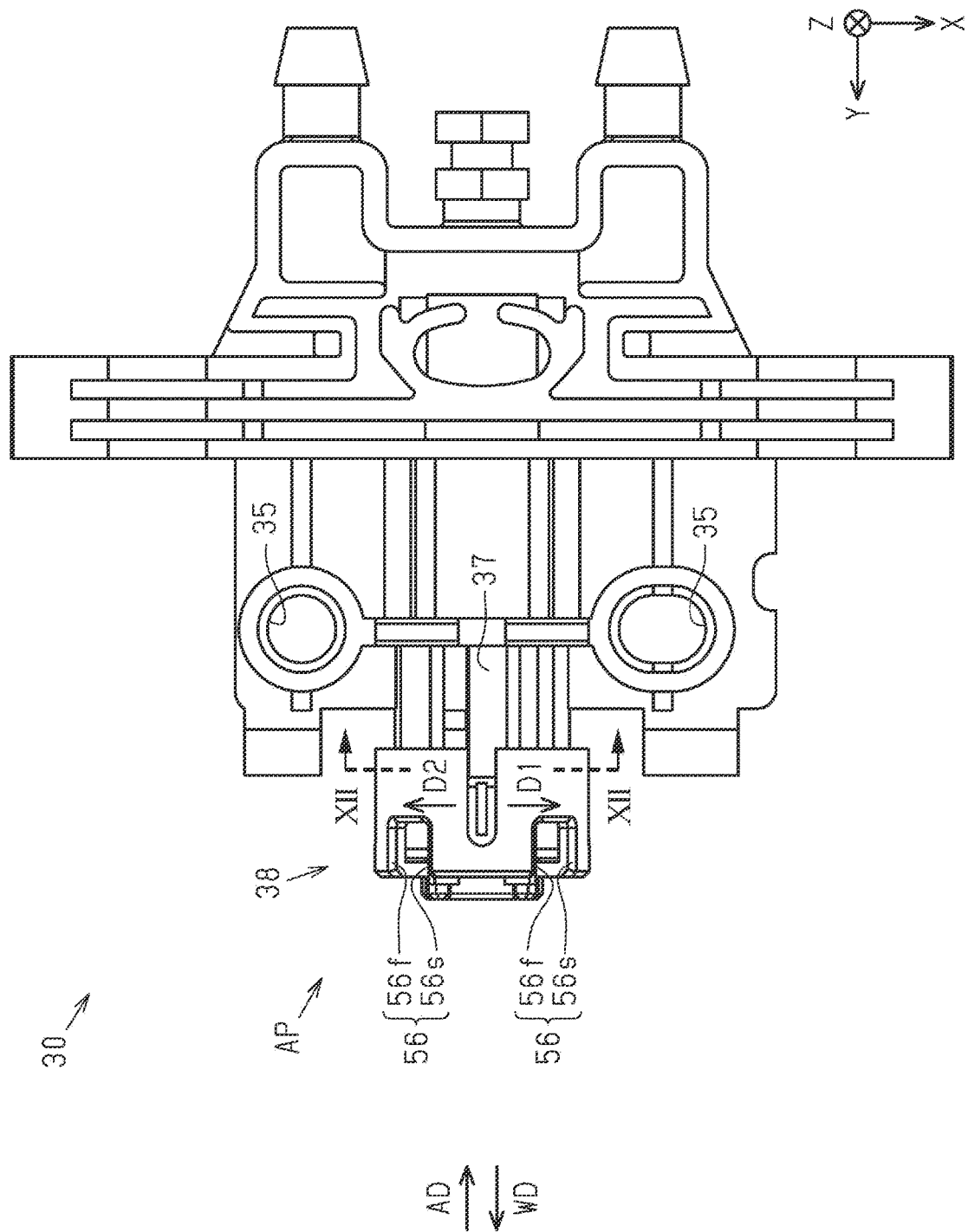
FIG. 5 is a plan view illustrating a supply member with a holding member in an attachment position.

The holding member 38 is rotated in the first circumferential direction D1 from the moving position MP in FIG. 3 to the attachment position AP in FIG. 5, as illustrated in FIG. 3 and FIG. 5. The holding member 38 is rotated in the second circumferential direction D2 from the attachment position AP in FIG. 5 to the moving position MP in FIG. 3. In this operation, the angle of rotation of the holding member 38 is less than 360 degrees. For example, the angle of rotation of the holding member 38 may be less than 180 degrees. In other words, the holding member 38 may be switched between the moving position MP and the attachment position AP within one complete rotation or a half rotation of the holding member 38. The holding member 38 according to the embodiment is switched between the moving position MP and the attachment position AP when the holding member 38 is rotated by about 45 degrees.

Figure 6:
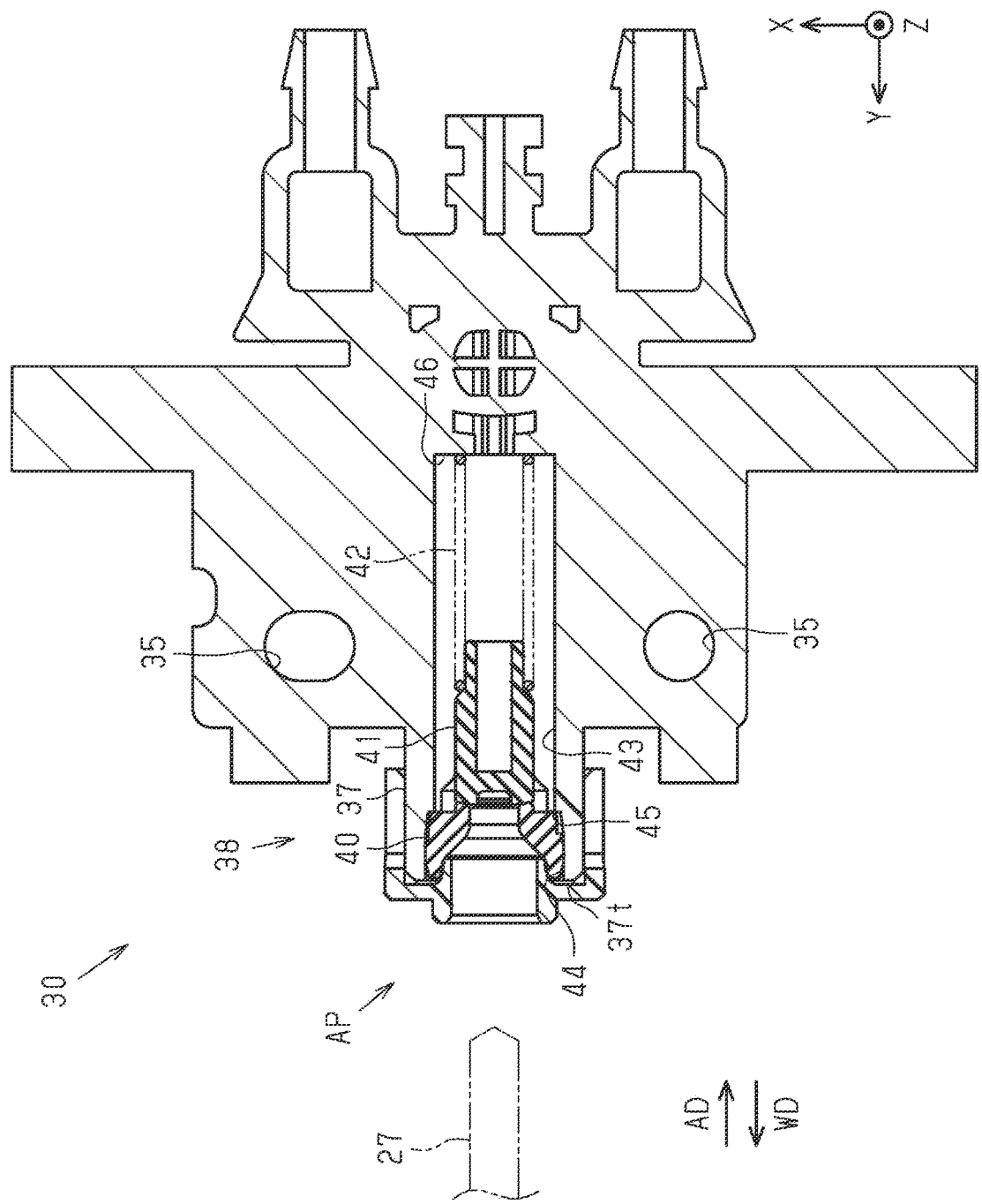
FIG. 6 is a cross-sectional view taken along line VI-VI in FIG. 4.

The supply member 30 includes a sealing member 40 as illustrated in FIG. 6. The supply member 30 may include a valve element 41 and a pressing member 42. The supply member 30 may include a supply path 43, a supply port 44, a first support surface 45, and a second support surface 46. The supply port 44 is open at a tip 37*t* of the supply tube 37.

The supply path 43 is a flow path through which an ink flows in the supply tube 37. An upstream end of the supply path 43 communicates with the inside of the storage section 29. The supply port 44 is a downstream end of the supply path 43 and communicates with the supply path 43. When the ink container 23 is attached to the attachment section 16, the supply needle 27 is inserted into the supply tube 37 through the supply port 44, enabling the supply tube 37 to supply the ink in the storage section 29 to the printer 11.

The first support surface 45 supports the sealing member 40. The first support surface 45 is provided in the supply tube 37. The first support surface 45 is provided in the supply path 43. The second support surface 46 supports the pressing member 42. The second support surface 46 is provided in the supply tube 37. The second support surface 46 is provided in the supply path 43.

The sealing member 40, the valve element 41, and the pressing member 42 are disposed in the supply tube 37. The sealing member 40, the valve element 41, and the pressing member 42 are disposed in the middle of the supply path 43. The sealing member 40 according to the embodiment is disposed between the valve element 41 and the holding member 38.

The valve element 41 is made of, for example, an elastic material. The valve element 41 according to the embodiment is made of rubber. The pressing member 42 presses the valve element 41 to press the valve element 42 against the sealing member 40. The pressing member 42 includes, for example, a spring.

Figure 7:
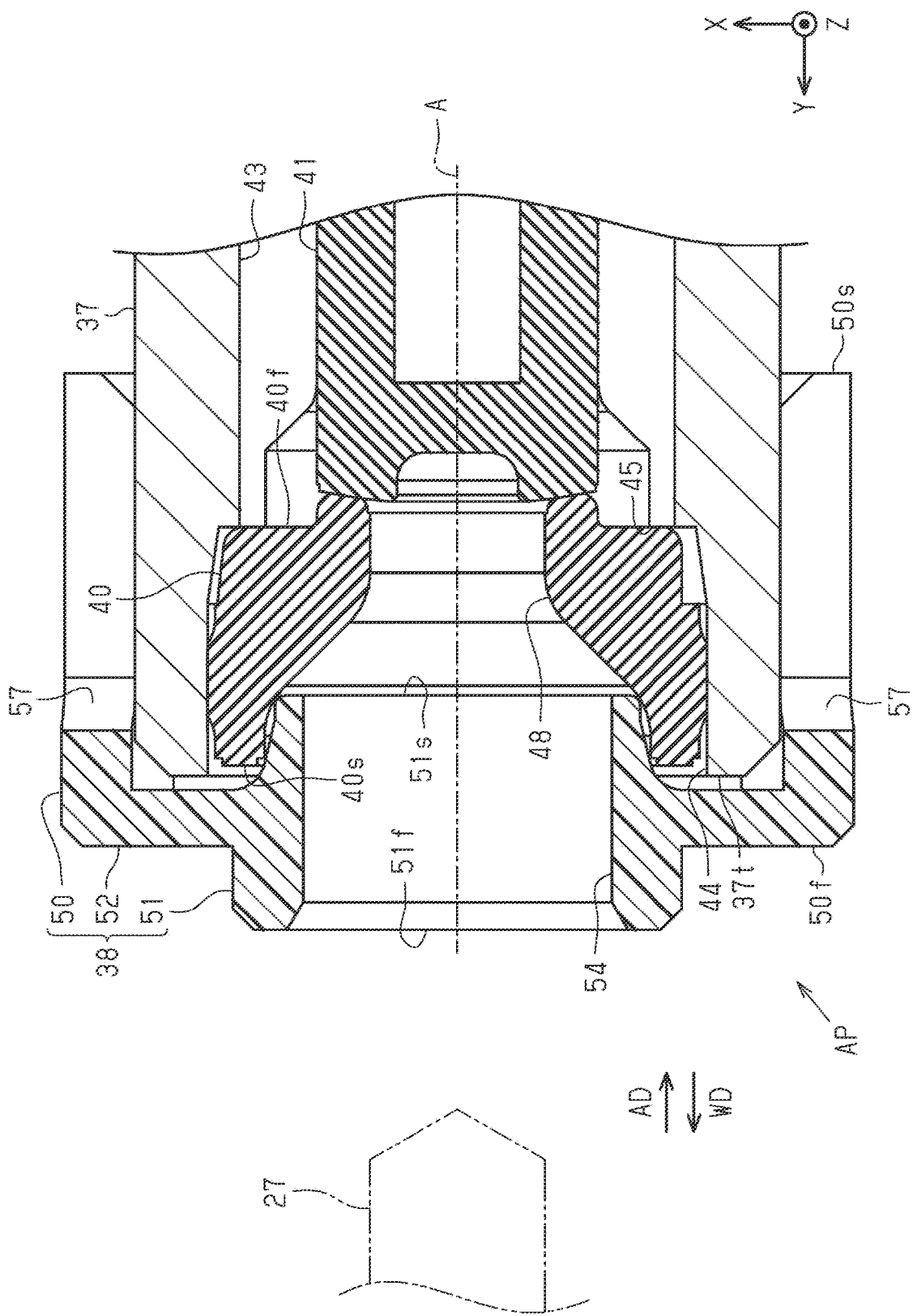
FIG. 7 is an enlarged view of the holding member illustrated in FIG. 6.

The sealing member 40 may have a first sealing end 40*f*, a second sealing end 40*s*, and an insertion hole 48 as illustrated in FIG. 7. The first sealing end 40*f* is an end portion of the sealing member 40 and is in contact with the first support surface 45. The second sealing end 40*s* is an end portion opposite to the first sealing end 40*f* in the sealing member 40.

The first sealing end 40*f* of the sealing member 40 is configured to be in contact with the valve element 41. The sealing member 40 comes into contact with the valve element 41 to block the supply tube 37. The sealing member 40 blocks the supply tube 37, thereby suppressing leakage of the ink from the supply tube 37 from occurring. The sealing member 40 is made of, for example, an elastic material. The sealing member 40 according to the embodiment is made of rubber.

The insertion hole 48 is a hole into which the supply needle 27 is inserted. The insertion hole 48 extends through the sealing member 40 from the first sealing end 40f to the second sealing end 40s. Accordingly, the sealing member 40 has a tubular shape. When the ink container 23 is attached to the attachment section 16, the supply needle 27 is inserted into the insertion hole 48. A minimum inner diameter of the insertion hole 48 is smaller than an outer diameter of the supply needle 27. The sealing member 40 is in contact with the inserted supply needle 27.

In response to the supply needle 27 inserted into the insertion hole 48 pressing the valve element 41, the valve element 41 moves away from the sealing member 40, thereby enabling the sealing member 40 and the valve element 41 to release the blockage of the supply tube 37. As a result, the ink can be supplied from the storage section 29 to the printer 11 through the supply tube 37 and the supply needle 27.

Holding Member

The holding member 38 holds the sealing member 40 as illustrated in FIG. 7. The holding member 38 is attached to the supply tube 37 to hold the sealing member 40. The holding member 38 according to the embodiment holds the sealing member 40 from the second sealing end 40s. The holding member 38 is made of, for example, resin.

The holding member 38 may include an external cylinder 50, an internal cylinder 51, and a coupling section 52. In this embodiment, one end of the external cylinder 50 in the attachment direction AD is referred to as a first outer end 50f and the other end is referred to as a second outer end 50s. In this embodiment, one end of the internal cylinder 51 in the attachment direction AD is referred to as a first inner end 51f and the other end is referred to as a second inner end 51s. The first inner end 51f and the second outer end 50s according to the embodiment are also ends of the holding member 38.

The coupling section 52 couples the external cylinder 50 and the internal cylinder 51. More specifically, the coupling section 52 couples the first outer end 50f of the external cylinder 50 and a central portion of the internal cylinder 51 in the attachment direction AD. The holding member 38 may include a supply hole 54 defined by the internal cylinder 51. The supply hole 54 is a hole into which the supply needle 27 is inserted. When the ink container 23 is attached to the attachment section 16, the supply needle 27 is inserted into the supply hole 54.

When the holding member 38 is attached to the supply tube 37, the internal cylinder 51 enters the insertion hole 48 from the second sealing end 40s. During the attachment, the second inner end 51s of the internal cylinder 51 comes into contact with the inner circumferential surface of the insertion hole 48. More specifically, the holding member 38 holds the sealing member 40 such that the internal cylinder 51 presses and widens the sealing member 40, thereby pressing the sealing member 40 against the supply tube 37. The external cylinder 50 is located outside the supply tube 37 in a state in which the holding member 38 is attached to the supply tube 37. The holding member 38 holds the supply tube 37 and the sealing member 40 in the radial direction by using the external cylinder 50 and the internal cylinder 51. The radial direction according to the embodiment is a radial direction with respect to a central axis A of the supply tube 37. The central axis A according to the embodiment is parallel to the Y-axis.

Figure 8:
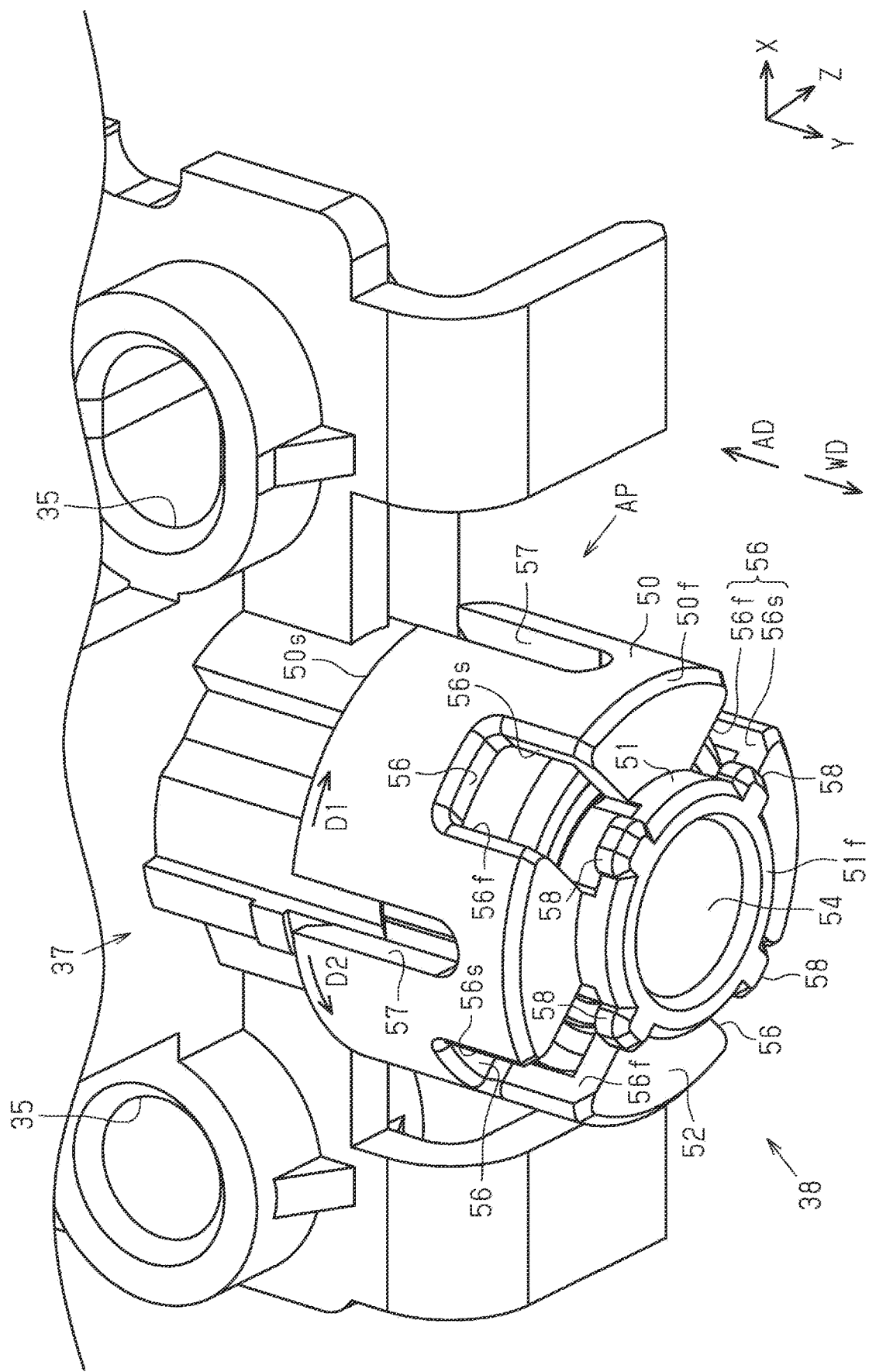
FIG. 8 is a perspective view illustrating a holding member and a supply tube.

The holding member 38 may have an opening 56, a notch 57, and a convex portion 58 as illustrated in FIG. 8. The holding member 38 may have one or more openings 56, one or more notches 57, and one or more convex portions 58. The holding member 38 according to the embodiment has four openings 56, four notches 57, and four convex portions 58.

The four openings 56 are equally spaced in the first circumferential direction D1. Each opening 56 is provided at least in the coupling section 52 and extends through the coupling section 52. The openings 56 according to the embodiment extend through the coupling section 52 and the external cylinder 50. The four openings 56 according to the embodiment divide the coupling section 52 into four. Each opening 56 has a first surface 56f and a second surface 56s that are aligned in the first circumferential direction D1 and face each other; that is, the holding member 38 according to the embodiment has a plurality of first surfaces 56f and a plurality of second surfaces 56s. The first surfaces 56f face in the first circumferential direction D1. The second surfaces 56s face in the second circumferential direction D2.

The notches 57 are formed in the external cylinder 50. The notches 57 are recessed from the second outer end 50s in the detachment direction WD. The notches 57 enable the external cylinder 50 to elastically deform. The notches 57 according to the embodiment are located between the openings 56 in the first circumferential direction D1.

The convex portions 58 are formed in the internal cylinder 51. The convex portions 58 protrude outward from the first inner end 51f in the radial direction. The convex portions 58 are provided at the same positions as the openings 56 in the first circumferential direction D1. In other words, the convex portions 58 and the openings 56 are aligned in the attachment direction AD.

Figure 9:
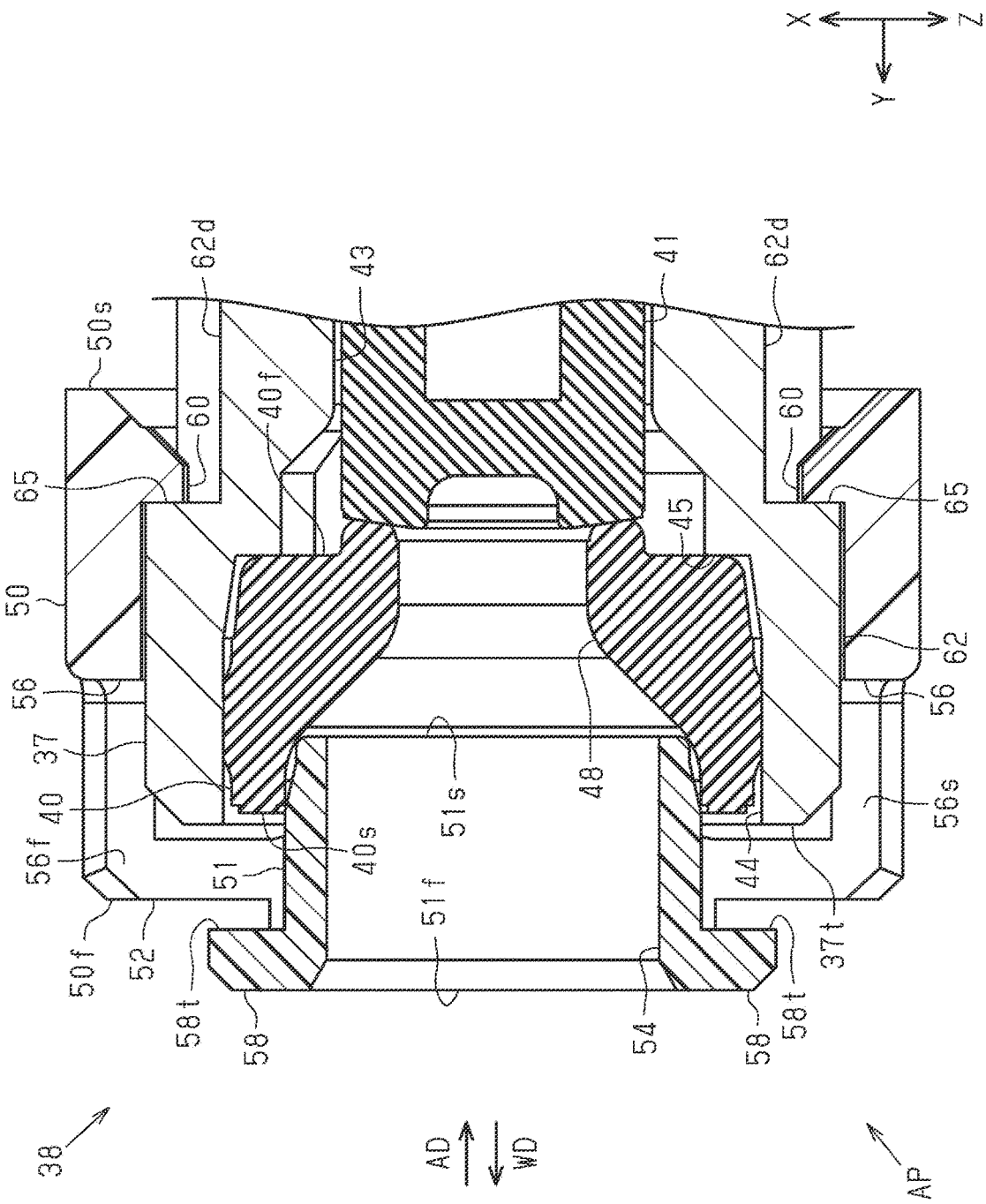
FIG. 9 is a cross-sectional view taken along line IX-IX in FIG. 4.

The convex portion 58 has a third surface 58t as illustrated in FIG. 9. The third surface 58t faces in the attachment direction AD. The third surface 58t is located between the first inner end 51f and the opening 56 in the attachment direction AD; that is, the third surface 58t is located between the first surface 56f and the first inner end 51f. The third surface 58t is located between the second surface 56s and the first inner end 51f.

The holding member 38 has a protrusion 60 that comes into contact with the supply tube 37. The holding member 38 may include one or more protrusions 60. The protrusions 60 may be equally spaced in the first circumferential direction D1. The holding member 38 according to the embodiment includes four protrusions 60. The protrusions 60 may be provided in the second outer end 50s. The protrusions 60 protrude inward from the external cylinder 50. The protrusions 60 are provided between the notches 57 arranged in the first circumferential direction D1. In this embodiment, at least part of one opening 56, at least part of one convex portion 58, and at least part of one protrusion 60 are located at the same position in the first circumferential direction D1. In other words, the convex portion 58, the opening 56, and the protrusion 60 are aligned in the attachment direction AD.

Supply Tube

Figure 10:
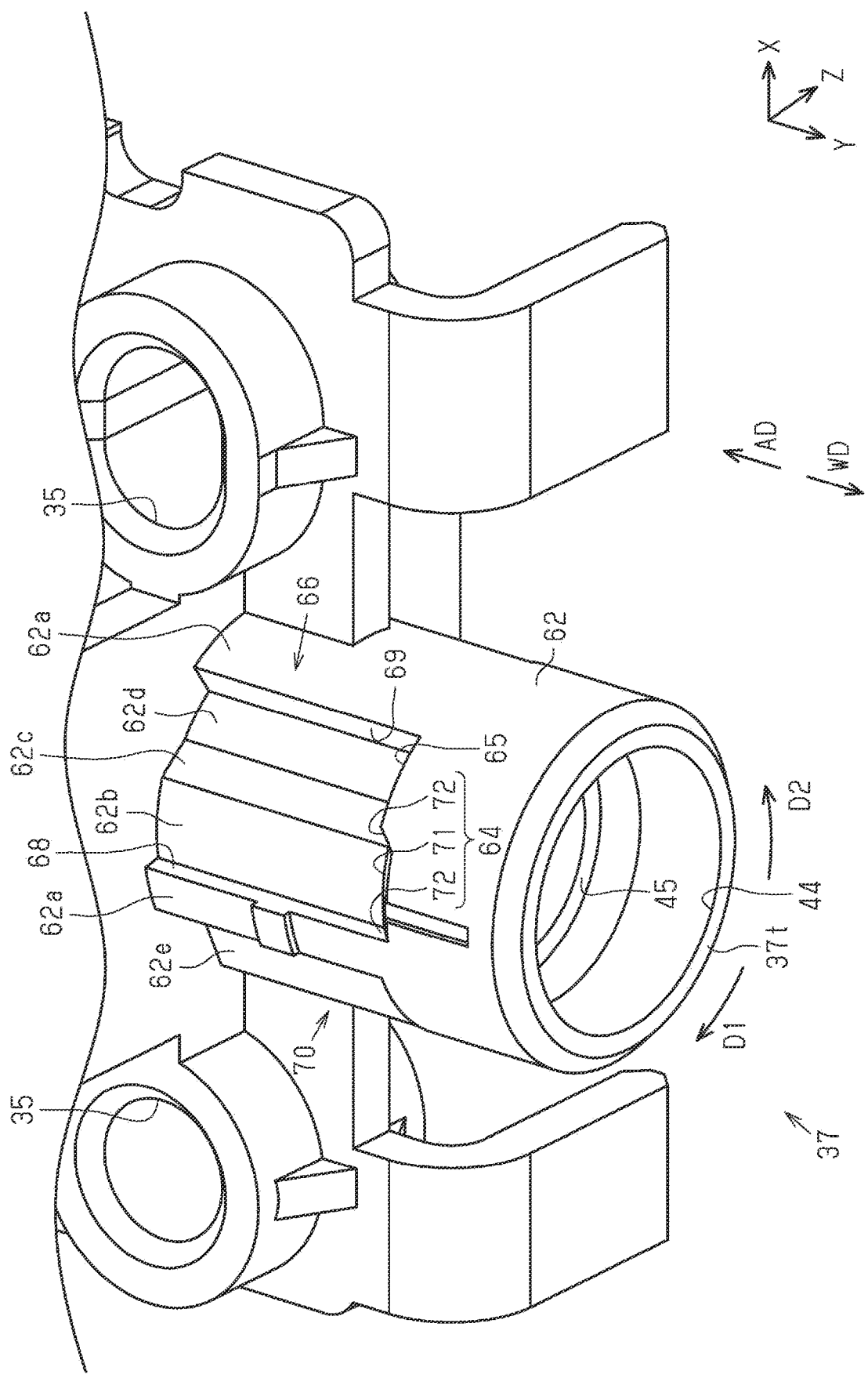
FIG. 10 is a perspective view illustrating a supply tube.

The supply tube 37 has an outer surface 62 as illustrated in FIG. 10. The outer surface 62 may have a first outer surface 62a, a second outer surface 62b, a third outer surface 62c, a fourth outer surface 62d, and a fifth outer surface 62e.

The supply tube 37 has one or more guide portions 64 and one or more stop portions 65. The supply tube 37 may have one or more regulating sections 66. The regulating section 66 may have a first rib 68 and a second rib 69. The supply tube 37 may have one or more recesses 70. The guide portion 64 and the stop portion 65 are aligned in the first circumferential direction D1 in the outer surface 62 of the supply tube 37. One guide portion 64 and one stop portion 65 may be provided per regulating section 66. The guide portion 64, the stop portion 65, the regulating section 66, and the recess 70 are provided in the outer surface 62.

The regulating section 66 according to the embodiment is a concave portion formed at a position away from the tip 37*t* of the supply tube 37 in the attachment direction AD. The supply tube 37 may have a plurality of regulating sections 66. The supply tube 37 according to the embodiment has two guide portions 64, two stop portions 65, two regulating sections 66, and two recesses 70. The regulating sections 66 and the recesses 70 are provided alternately in the first circumferential direction D1.

The first outer surface 62*a* is an outer surface of the regulating section 66 and the recess 70. The second outer surface 62*b*, the third outer surface 62*c*, and the fourth outer surface 62*d* are inner surfaces of the regulating section 66. The fifth outer surface 62*e* is an inner surface of the recess 70. The fifth outer surface 62*e* may be a curved surface.

The second outer surface 62*b*, the third outer surface 62*c*, and the fourth outer surface 62*d* are aligned in the first circumferential direction D1. The first outer surface 62*a*, the second outer surface 62*b*, the third outer surface 62*c*, and the fourth outer surface 62*d* are located differently in the radial direction. The first outer surface 62*a* is the outermost surface. The fourth outer surface 62*d* is the innermost surface. The fourth outer surface 62*d* is away from the first outer surface 62*a* in the radial direction compared with the second outer surface 62*b* and the third outer surface 62*c*. The second outer surface 62*b* is located between the first outer surface 62*a* and the fourth outer surface 62*d* in the radial direction. The third outer surface 62*c* couples the second outer surface 62*b* and the fourth outer surface 62*d*. The third outer surface 62*c* is tilted with respect to the first circumferential direction D1.

The first rib 68 according to the embodiment is a step between the first outer surface 62*a* and the second outer surface 62*b* in the first circumferential direction D1. The second rib 69 according to the embodiment is a step between the fourth outer surface 62*d* and the first outer surface 62*a* in the first circumferential direction D1. Each of the first rib 68 and the second rib 69 according to the embodiment has a surface substantially vertical with respect to the first outer surface 62*a*. The first rib 68 is located at one end of the regulating section 66 and the second rib 69 is located at the other end of the regulating section 66 in the first circumferential direction D1.

The guide portion 64 guides the movement of the protrusion 60 in the attachment direction AD and the detachment direction WD. The guide portion 64 may have a guide surface 71 and a guide wall 72. The guide surface 71 is located in the detachment direction WD with respect to the second outer surface 62*b*. The guide surface 71 couples the first outer surface 62*a* and the second outer surface 62*b*. The guide surface 71 is tilted with respect to the central axis A. The guide surface 71 forms obtuse angles with respect to the first outer surface 62*a* and the second outer surface 62*b*. In this embodiment, one guide portion 64 has one guide surface 71 and two guide walls 72. The two guide walls 72 are disposed at respective ends of the guide surface 71 in the first circumferential direction D1. One guide wall 72 of the two guide walls 72 may have the same plane as the first rib 68.

The stop portion 65 according to the embodiment is a step between the fourth outer surface 62*d* and the first outer surface 62*a* in the detachment direction WD. The stop portion 65 is located in the detachment direction WD with respect to the fourth outer surface 62*d*. The stop portion 65 according to the embodiment has a surface substantially vertical with respect to the first outer surface 62*a*.

Figure 11:
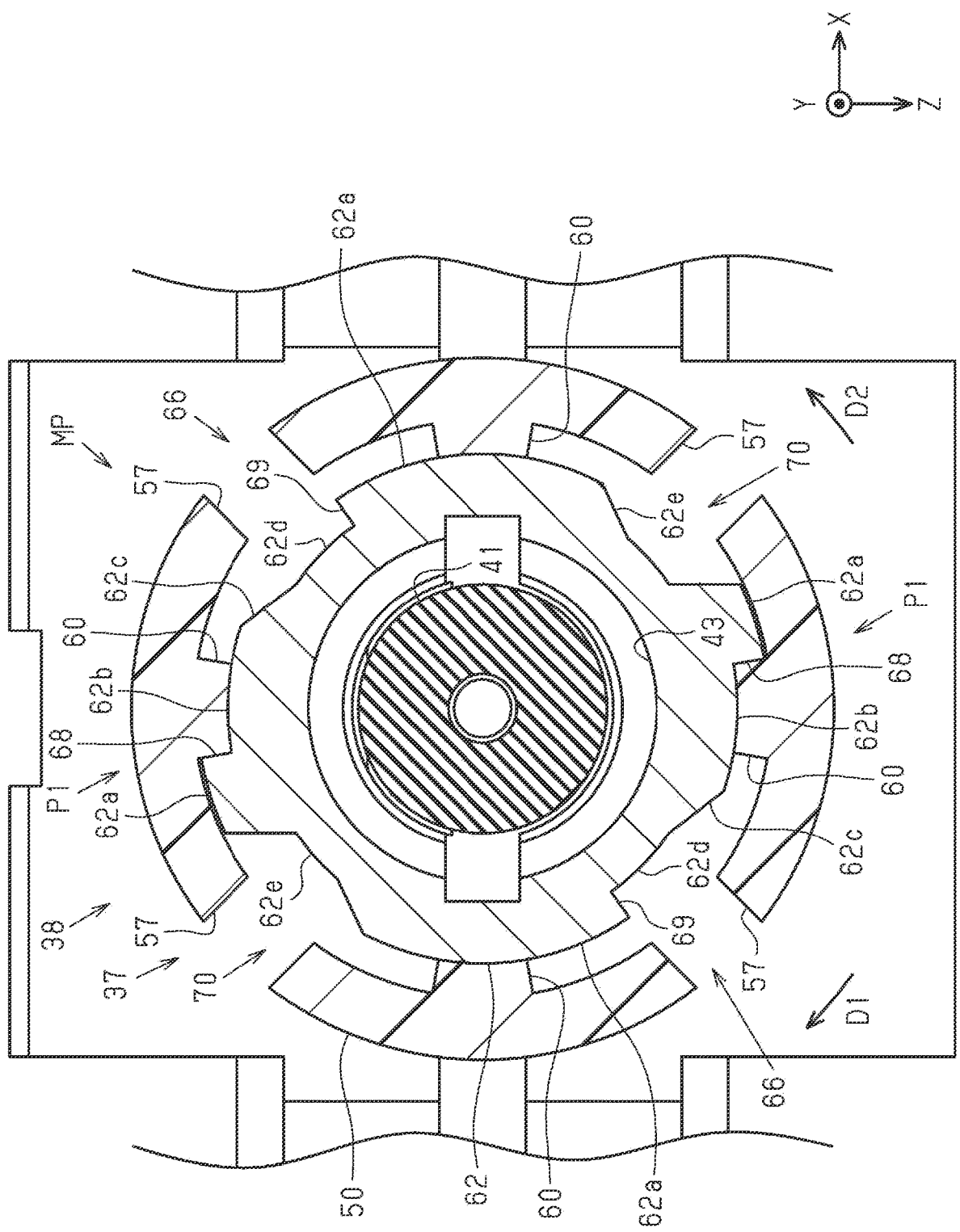
FIG. 11 is a cross-sectional view taken along line XI-XI in FIG. 3.
Figure 12:
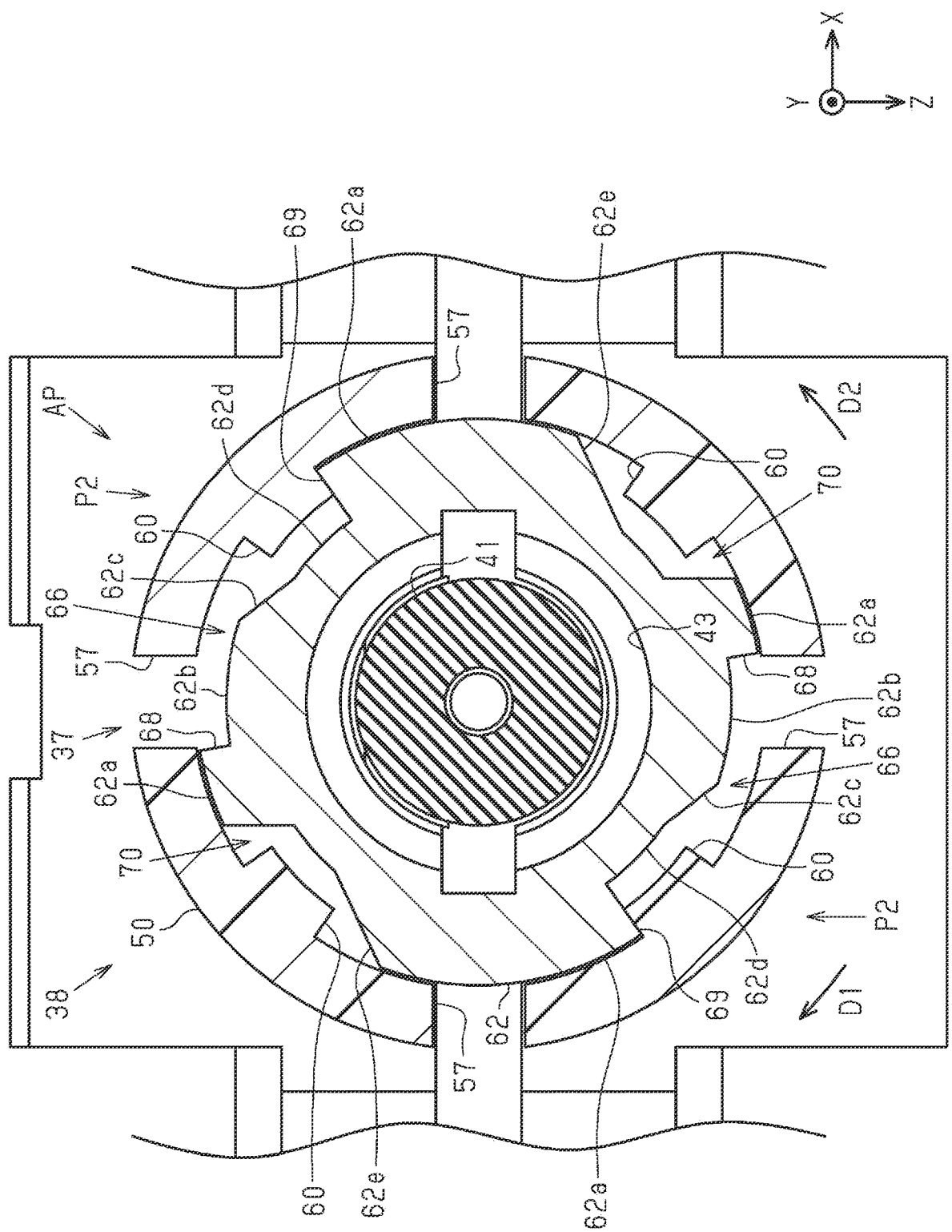
FIG. 12 is a cross-sectional view taken along line XII-XII in FIG. 5.

As illustrated in FIG. 11 and FIG. 12, the regulating section 66 regulates the moving range of the protrusion 60 in the first circumferential direction D1 to a range from a first position P1 in FIG. 11 to a second position P2 in FIG. 12. The first rib 68 comes into contact with the protrusion 60 located in the first position P1 and regulates the movement of the protrusion 60 in the second circumferential direction D2. When the holding member 38 is in the moving position MP, the protrusion 60 located in the regulating section 66 is located in the first position P1. The second rib 69 comes into contact with the protrusion 60 located in the second position P2 and regulates the movement of the protrusion 60 in the first circumferential direction D1. When the holding member 38 is in the attachment position AP, the protrusion 60 located in the regulating section 66 is located in the second position P2.

Figure 13:
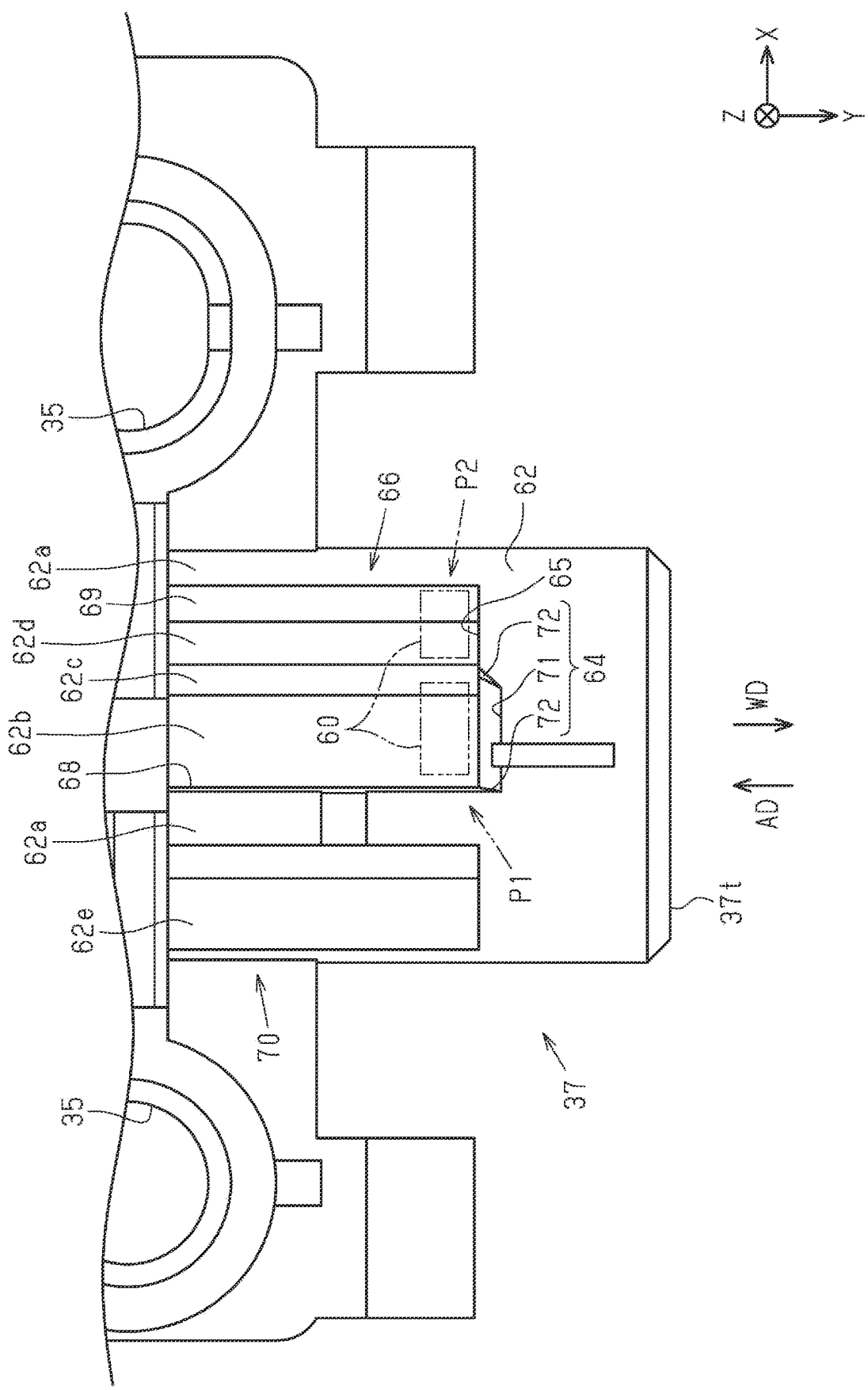
FIG. 13 is a plan view illustrating a supply tube.

The protrusion 60 that is located in the first position P1 and the guide portion 64 are aligned in the detachment direction WD as illustrated in FIG. 13. The protrusion 60 that is located in the second position P2 and the stop portion 65 are aligned in the detachment direction WD. The stop portion 65 comes into contact with the protrusion 60 to regulate the movement of the holding member 38 in the detachment direction WD as illustrated in FIG. 9.

Refill

The ink container 23 can be refilled. Refilling in this embodiment means filling a used ink container 23 with ink. An ink container 23 used by a user is collected and refilled by a technician. The refilled ink container 23 is used by the user or another person.

At least one of the holding member 38, the sealing member 40, the valve element 41, and the pressing member 42 of the ink container 23 as illustrated in FIG. 6 may be replaced. Such part replacement may be performed at the time of refilling. To replace a part, first the holding member 38 is detached from the supply tube 37.

The holding member 38 before the detachment operation is in the attachment position AP as illustrated in FIG. 5. For example, the technician moves a jig (not illustrated) in the attachment direction AD to align the jig to the opening 56. In this state, the jig is turned in the second circumferential direction D2 and the jig presses the first surface 56*f*, thereby turning the holding member 38 in the second circumferential direction D2. The jig according to the embodiment is turned by about 45 degrees to change the position of the holding member 38 from the attachment position AP to the moving position MP.

As illustrated in FIG. 12, when the holding member 38 is in the attachment position AP, in this embodiment, two protrusions 60 of the four protrusions 60 are located within the regulating sections 66, and the other two protrusions 60 are located within the recesses 70.

As illustrated in FIG. 11, when the holding member 38 is switched to the moving position MP, the two protrusions 60 of the holding member 38 in the regulating sections 66 come into contact with the first ribs 68, regulating the turn in the second circumferential direction D2. Accordingly, the two protrusions 60 in the regulating sections 66 are located in the first positions P1 and are aligned with the guide portions 64 in the detachment direction WD.

In this state, the two protrusions 60 positioned in the recesses 70 run on the first outer surfaces 62a, thereby elastically deforming the external cylinder 50. Accordingly, turning the holding member 38 in the second circumferential direction D2 requires a force larger than that for turning the holding member 38 in the first circumferential direction D1.

Next, the jig presses the third surface 58t in the detachment direction WD as illustrated in FIG. 3. More specifically, the jig moves in the detachment direction WD in the state in which part of the jig is aligned with the third surface 58t, and thereby the holding member 38 is detached from the supply tube 37. In this operation, the protrusion 60 in the first position P1 is moved from the second outer surface 62b to run on the first outer surface 62a via the guide portion 64.

After the holding member 38 is detached from the supply tube 37, the sealing member 40, the valve element 41, and the pressing member 42 can be removed via the supply port 44. All or some of the holding member 38, the sealing member 40, the valve element 41, and the pressing member 42 may be replaced.

To attach the holding member 38 to the supply tube 37 as illustrated in FIG. 3, the jig is moved in the attachment direction AD with the jig holding the holding member 38. For example, the jig may hold the convex portion 58. The jig attaches the holding member 38, which is in the moving position MP with respect to the supply tube 37, to the supply tube 37.

In this embodiment, two protrusions 60 of the four protrusions 60 pass the guiding sections 64 and enter the regulating sections 66 as illustrated in FIG. 11. The other two protrusions 60 move along the first outer surfaces 62a and move across the recesses 70.

After the holding member 38 is attached to the supply tube 37, the jig turns in the first circumferential direction D1 as illustrated in FIG. 3. The jig turning in the first circumferential direction D1 presses the second surface 56s, thereby turning the holding member 38 in the first circumferential direction D1. The jig according to the embodiment is turned by about 45 degrees to switch the position of the holding member 38 from the moving position MP to the attachment position AP.

When the holding member 38 is switched to the attachment position AP, the two protrusions of the holding member 38 in the regulating sections 66 come into contact with the second ribs 69, regulating the turn in the first circumferential direction D1 as illustrated in FIG. 12. Accordingly, the two protrusions 60 in the regulating sections 66 are located in the second positions P2 and are aligned with the stop portions 65 in the detachment direction WD; that is, the two protrusions 60 come into contact with the stop portions 65 to regulate the movement of the holding member 38 in the detachment direction WD.

The two protrusions 60 located on the first outer surface 62a enter the recesses 70, and thereby the inner surface of the external cylinder 50 comes into contact with the outer surface 62 of the supply tube 37. Accordingly, in the attachment position AP, the movement of the holding member 38 in the radial direction is regulated.

The jig is detached from the holding member 38 attached to the supply tube 37. Next, the ink container 23 is refilled with an ink. Ink refilling may be performed without replacing parts. Ink refilling is performed by inserting a refill needle into the supply tube 37. The configuration of the refill needle is similar to that of the supply needle 27 and its illustration is omitted.

The refill needle is inserted into the supply hole 54 and the insertion hole 48 as illustrated in FIG. 7, similarly to the supply needle 27. The refill needle presses the valve element 41 to release the blockage of the supply tube 37. In this state, an ink is sent through the refill needle and the supply path 43 to the ink container 23. The storage section 29 stores the sent ink. When the refill needle is removed, the valve element 41 comes into contact with the sealing member 40 to block the supply tube 37. This completes the refilling.

The holding member 38 attached to the supply tube 37 has an indication that indicates that a refilling operation has been performed. The indication according to the embodiment is a color of the holding member 38. For example, the holding member 38 may be molded by using a colored resin as a raw material such that the entire holding member 38 is colored. In this embodiment, the color of the entire holding member 38 serves as the indication, and thus the reference numeral of the indication is omitted.

The color is a color that can be visually identified by a person such as a technician, a user, or the like. Different colors include not only different hues, such as white, black, blue, or yellow, but also colors having different transmittance, such as transparency, and different shades. In other words, one example holding member 38 may be colorless and transparent.

The color of the holding member 38 attached to the supply tube 37 in manufacturing the ink container 23 may be the same as the color of the supply member 30. In a refilling operation, the holding member 38 may be replaced with a holding member 38 that has a color different from that of the supply member 30. In another case, the color of the first holding member 38 may be different from that of the supply member 30, and the color of the holding member 38 after replacement may be the same as the color of the supply member 30.

By using the same color for the holding member 38 and the supply member 30 before replacement or after replacement, the holding member 38 can be compared with the supply member 30, and the difference in color of the holding members 38 can be more readily recognized. For example, the holding members 38 may be readily recognized when the color of the holding member 38 attached at the time of manufacture and the color of the supply member 30 are white, and the color of the holding member 38 attached at the time of refilling is a color close to white, such as gray.

This indication may be the number of refilling operations. In this embodiment, the color of the holding member 38 indicates the number of refilling operations. The color of the holding member 38 attached in a refilling operation may be changed depending on the color of the holding member 38 that has been previously attached. For example, the color of the holding member 38 first attached to the supply tube 37 may be white. When the ink container 23 to which the white holding member 38 has been attached is refilled, the technician may replace the white holding member 38 with a gray holding member 38. When the ink container 23 to which the gray holding member 38 has been attached is refilled, the technician may replace the gray holding member 38 with a black holding member 38. In this case, the gray holding member 38 indicates that refilling has been performed once. The black holding member 38 indicates that refilling has been performed twice.

The color of the holding member 38 may indicate the maximum refill number. For example, when the holding member 38 is changed from white to gray, and then to black in this order and the refill number is two, the black holding member 38 indicates that the refilling of the maximum number of times has been made.

The color of the holding member 38 may indicate parts to be replaced. In other words, the color of the holding member 38 may indicate parts that do not require replacement. For example, the frequency of replacement of the sealing member 40, the valve element 41, and the pressing member 42 may be different. For example, the sealing member 40 and the valve element 41 may be replaced every time, whereas the pressing member 42 may be replaced every two times. When the holding members 38 of white, gray, and black are attached in this order, the white holding member 38 indicates that the sealing member 40 and the valve element 41 need to be replaced together with the replacement with the gray holding member 38. In other words, the white holding member 38 indicates that the pressing member 42 does not require replacement. The gray holding member 38 indicates that the sealing member 40, the valve element 41, and the pressing member 42 require replacement.

Operations of Embodiment

Operations according to the embodiment will be described. A used ink container 23 is refilled and a holding member 38 is replaced. Accordingly, the indication of the replaced holding member 38 enables the user to visually recognize whether or not the ink container 23 has been refilled.

Advantages of Embodiment

Advantages of the embodiment will be described.

1. The holding member 38 is detachably attached to the supply tube 37, and thus the holding member 38 can be readily replaced when a refilling operation is performed. The holding member 38 has an indication indicating that a refilling operation has been performed, enabling the user to recognize that this product has been refilled.
2. The indication is the number of refilling operations. The holding member 38 has an indication indicating the number of refilling operations, and thus the number of refilling operations can be readily managed.
3. The indication is a color of the holding member 38. The color enables the user to recognize that this product has been refilled.
4. The holding member 38 is turned in the first circumferential direction D1 or the second circumferential direction D2 so as to be attached to or detached from the supply tube 37, and thus the holding member 38 can be replaced without being rotated multiple times.

Modifications

This embodiment may be modified and implemented as follows. The embodiment and the following modifications may be combined with each other within a technically consistent scope.

First Modification

Figure 14:
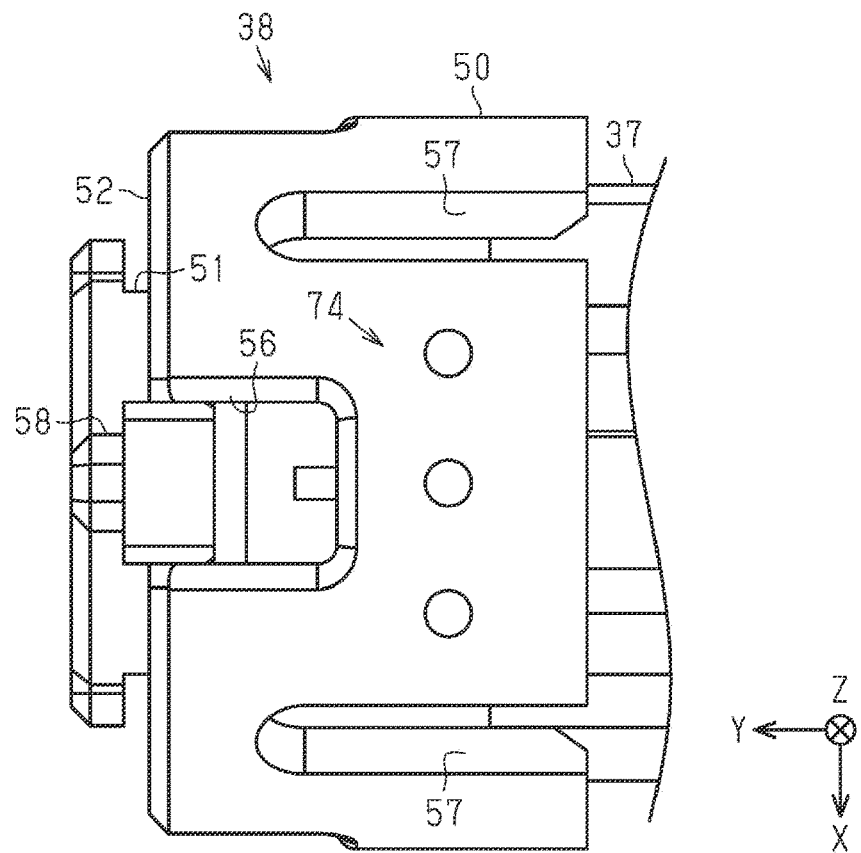
FIG. 14 is a plan view illustrating a holding member according to a first modification.
Figure 15:
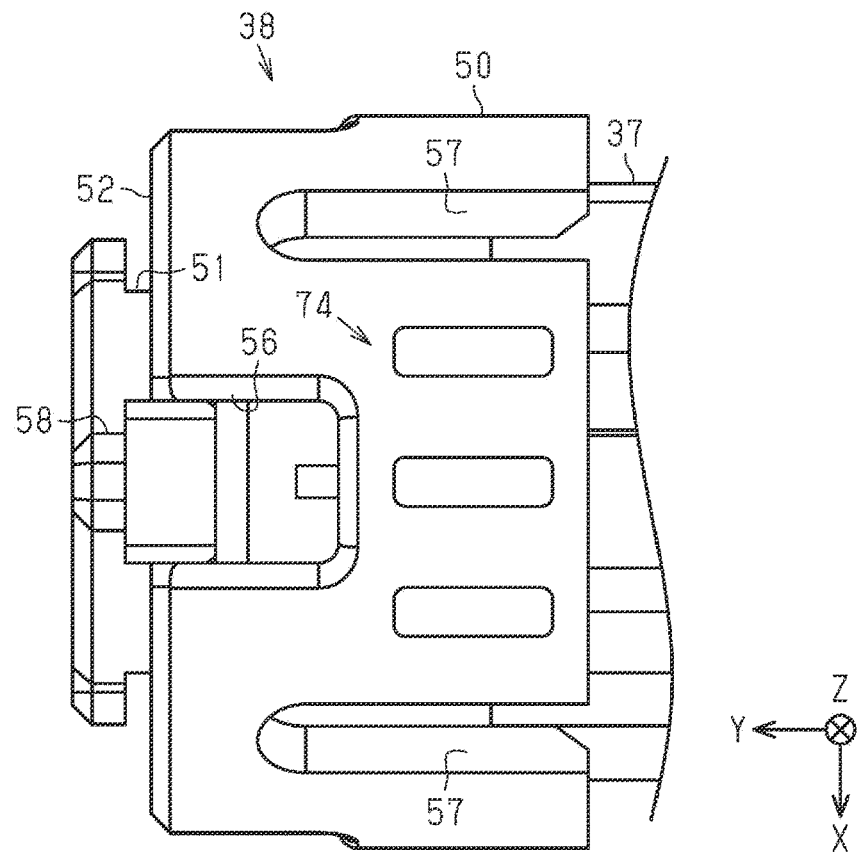
FIG. 15 is a plan view illustrating a holding member according to a first modification.

An indication 74 may be a concave portion or a convex portion on the holding member 38 as illustrated in FIG. 14 and FIG. 15. The indication 74 may be a convex portion protruding from the surface or a concave portion recessed from the surface. The indication 74 may be formed on the external cylinder 50 having the largest surface area of all the surfaces of the holding member 38. The indication 74 on the external cylinder 50 enables a conspicuous indication 74. The indication 74 may be circular as illustrated in FIG. 14 or bar-shaped as illustrated in FIG. 15. The indication 74 may be straight, curved, or wavy. The indication 74 may be formed in a ring shape in the circumferential direction. The indication 74 may indicate the number of refilling operations by using the number of concave portions and convex portions, the shapes of concave portions and convex portions, or a color of concave portions or convex portions.

More specifically, at the time of manufacturing, a holding member 38 that has no indication 74 may be attached. In other words, the holding member 38 having an indication 74 with no concave portion and no convex portion may indicate that the number of refilling operations is zero; that is, the holding member 38 having an indication 74 with no concave portion and no convex portion may indicate that the ink container 23 has not been refilled. When the ink container 23 is refilled, the holding member 38 may be replaced with a holding member 38 that has one more concave portion or convex portion than the number of concave portions and/or convex portions on the previously attached holding member 38. According to the method, the number of refilling operations can be indicated by the number of concave portions and convex portions. The indication 74 according to the first modification is concave portions and/or convex portions on the holding member 38, enabling the user to recognize that this product has been refilled when the user touches the indication 74.

Second Modification

Figure 16:
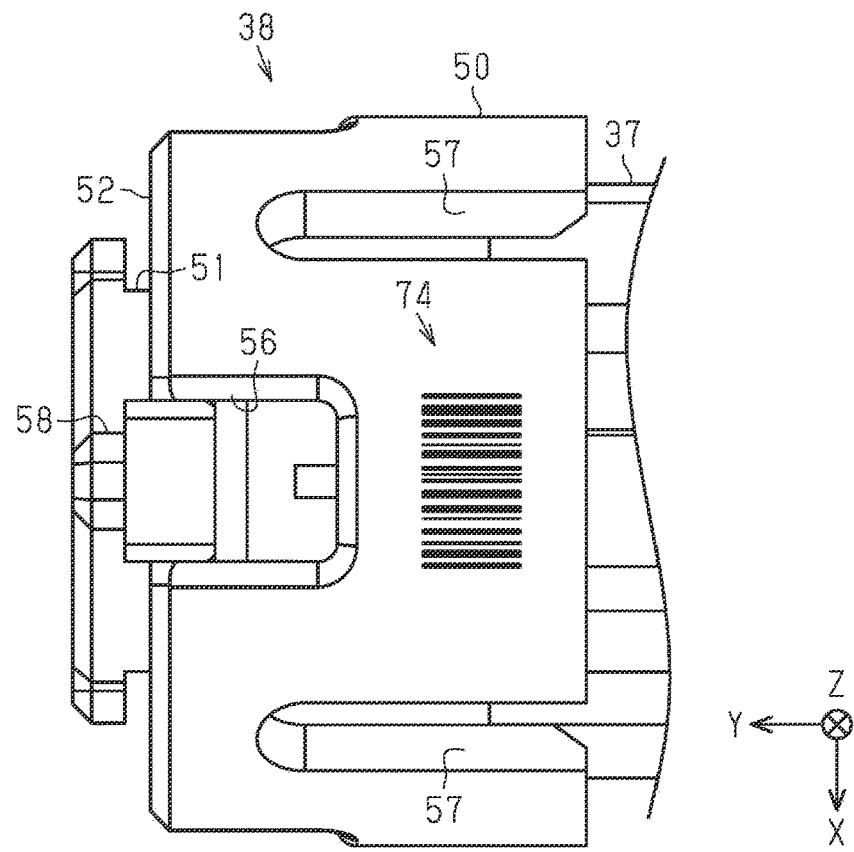
FIG. 16 is a plan view illustrating a holding member according to a second modification.
Figure 17:
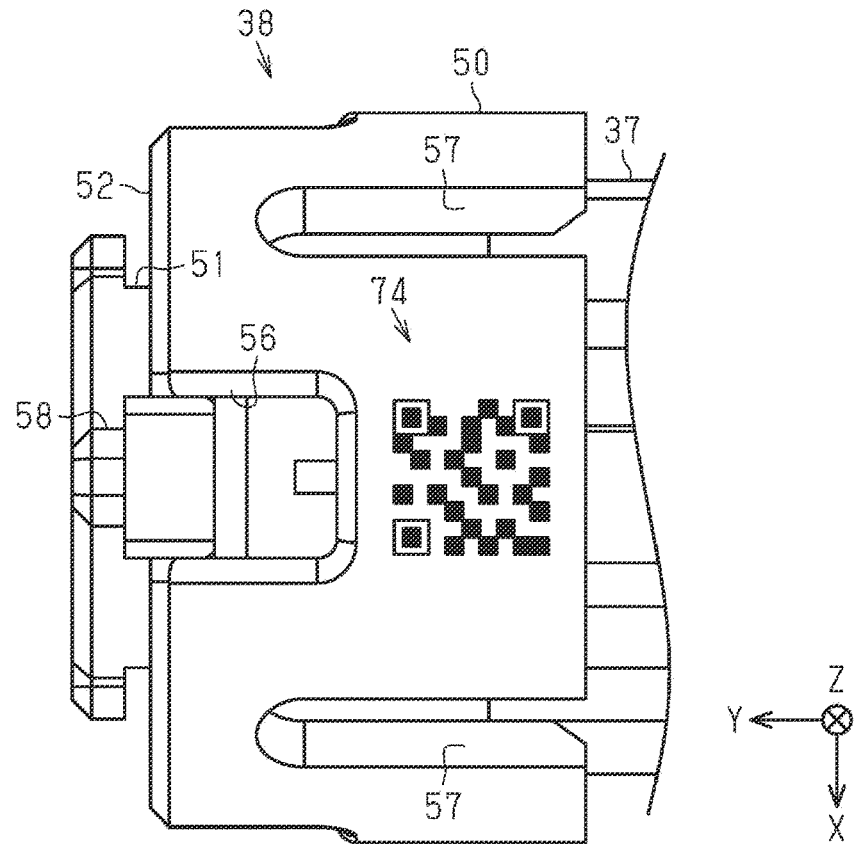
FIG. 17 is a plan view illustrating a holding member according to a second modification.

The indication 74 may be a code that includes a one-dimensional symbol as illustrated in FIG. 16. The indication 74 may be a code that includes a two-dimensional symbol as illustrated in FIG. 17. Such a code may be a concave portion or a convex portion on the holding member 38. The code may include information about refilling, information about the ink container 23, and information about an ink to be stored. The information about refilling may include, for example, the number of refilling operations, the dates of refilling operations, and the names of technicians who performed refilling operations. The information about the ink container 23 may include the date of manufacture of the ink container 23, the expiration date of the ink container 23, and the manufacturer. The information about the ink may include the color of the ink, and the type of the ink. The indication 74 according to the second modification is a code, enabling the holding member 38 to provide coded information, and thus the ink container 23 can be readily managed.

Other Modifications

The indication 74 may be a numeral, a mark, a character, a pattern, or a picture provided on the holding member 38. Numerals may include Chinese numerals, Arabic numerals, Roman numerals, and other numerals. Characters may include Braille characters. A Braille character formed of six dots is also a code including a two-dimensional symbol.

The indication 74 may be a concave portion and/or a convex portion provided on the holding member 38, or may be formed by printing, baking, engraving, cutting, melting, or other methods. The indication 74 may be a separate member that can be attached to the holding member 38. For example, the indication 74 may be a label that can be attached to the holding member 38. The indication 74 may be a plate that can be fit into the holding member 38.

The indication 74 may be marked on a detached holding member 38, and the marked holding member 38 may be attached to the supply tube 37. In other words, the holding member 38 may be used without replacement. The indication 74 may be marked on a holding member 38 in a state in which the holding member 38 is attached to the supply tube 37. The ink container 23 may be refilled without parts replacement.

The holding member 38 may include a plurality of indications 74 of the same type. For example, indications 74 may be provided in areas between notches 57 on the external cylinder 50. The holding member 38 may include a plurality of indications 74 of different types. For example, the holding member 38 may be marked with a color indicating that a refilling operation has been performed and a numeral indicating the number of refilling operations.

The indication 74 may be provided at any position on the holding member 38. For example, the indication 74 may be provided at at least one of the external cylinder 50, the internal cylinder 51, and the coupling section 52. The indication 74 may be provided on the inner side of the holding member 38.

The number of refilling operations may be indicated by a position of the indication 74. The holding member 38 may be colored with a plurality of colors as the indication 74. For example, the color of the external cylinder 50 of the holding member 38 may be partially changed. For example, the colors of the external cylinder 50 and the internal cylinder 51 of the holding member 38 may be changed. The number of refilling operations may be indicated by a combination of colors.

The indication 74 may indicate that a refilling operation has been performed; that is, a holding member 38 having no indication 74 may be attached to an ink container 23 that has not been refilled and a holding member 38 having an indication 74 may be attached to an ink container 23 that has been refilled.

The supply member 30 may include a film. Such a film may be attached to the holding member 38 or a supply tube 37 by, for example, thermal welding. The film attached to the holding member 38 may block, for example, the supply hole 54. The film attached to the supply tube 37 may block, for example, the supply port 44. Such a film may be provided in the middle of the supply path 43. The film suppresses leakage of the ink from the supply tube 37 from occurring. When the ink container 23 is attached to the attachment section 16, the film may be torn by the supply needle 27.

The supply tube 37 may include a recess 70 also in the stop portion 65. More specifically, the stop portion 65 may regulate the movement of the protrusion 60, which is located in the recess 70 in the attachment position AP, in the detachment direction WD. The stop portion 65 provided in the recess 70 reduces the occurrence of accidental detachment of the holding member 38, for example, when an impact is applied to the holding member 38.

Any ink that adheres to a medium 25 for printing onto the medium 25 may be selected for the ink. Example inks may include inks in which particles of a functional material composed of a solid material such a pigment or metal particles are dissolved, dispersed, or mixed in a solvent, and inks that contain a variety of compositions, such as water-based inks, oil-based inks, gel inks, and hot melt inks.

Supplementary Notes

Technical concepts understood from the above-described embodiments and modifications and their advantages will be described below.

A. An ink container includes a storage section configured to store an ink, a supply tube configured to supply the ink stored in the storage section to a printer, a sealing member disposed in the supply tube, and a holding member configured to hold the sealing member. The holding member is detachably attached to the supply tube and has an indication that indicates that a refilling operation has been performed.

In this configuration, the holding member is detachably attached to the supply tube, and thus the holding member can be readily replaced in a refilling operation. The holding member has an indication indicating that a refilling operation has been performed, enabling the user to recognize that this product has been refilled.

B. In the ink container, the indication may indicate the number of refilling operations. In this configuration, the indication indicates the number of refilling operations. The holding member has an indication indicating the number of refilling operations, and thus the number of refilling operations can be readily managed.

C. In the ink container, the indication may be a color of the holding member. In this configuration, the indication is a color of the holding member, enabling the user to visually recognize that this product has been refilled.

D. In the ink container, the indication may be a concave portion or a convex portion on the holding member. In this configuration, the indication is a concave portion or a convex portion on the holding member, enabling the user to recognize that this product has been refilled when the user touches the indication.

E. In the ink container, the indication may be a code including a one-dimensional symbol or a two-dimensional symbol. In this configuration, the indication is a code, enabling the holding member to provide coded information, and thus the ink container can be readily managed.

What is claimed is:

1. An ink container comprising:
   a storage section configured to store an ink;
   a supply tube configured to supply the ink stored in the storage section to a printer;
   a sealing member disposed in the supply tube; and
   a holding member configured to hold the sealing member, wherein
   the holding member is detachably attached to the supply tube and has an indication that indicates that a refilling operation was performed, and
   the indication is a color of the holding member.

2. The ink container according to claim 1, wherein the indication indicates the number of refilling operations.

3. The ink container according to claim 1, wherein the indication is a concave portion or a convex portion on the holding member.

4. The ink container according to claim 1, wherein the indication is a code including a one-dimensional symbol or a two-dimensional symbol.

5. An ink container comprising:
   a storage section configured to store an ink;
   a supply tube configured to supply the ink stored in the storage section to a printer;
   a sealing member disposed in the supply tube; and
   a holding member configured to hold the sealing member, wherein
   the holding member is detachably attached to the supply tube and has an indication that indicates that a refilling operation was performed, and
   the indication is a concave portion or a convex portion on the holding member.

* * * * *